April 22, 1969 M. H. CROWELL ET AL 3,440,477

MULTIPLE READOUT ELECTRON BEAM DEVICE

Filed Oct. 18, 1967

INVENTORS M. H. CROWELL
E. I. GORDON
BY Wilford L. Wisner
ATTORNEY

United States Patent Office 3,440,477

Patented Apr. 22, 1969

3,440,477
MULTIPLE READOUT ELECTRON BEAM DEVICE

Merton H. Crowell, Morristown, and Eugene I. Gordon, Convent Station, N.J., assignors to Bell Telephone Laboratories, Incorporated, Murray Hill, Berkeley Heights, N.J., a corporation of New York Filed Oct. 18, 1967, Ser. No. 676,133
Int. Cl. H01j *31/48*
U.S. Cl. 315—11 5 Claims

ABSTRACT OF THE DISCLOSURE

A television scan converter of the general type having a target including reversed-biased p-n junctions successively scanned by an electron beam includes improved means for providing multiple readout of the stored information. The improved means comprises a mutual adaptation of a semi-insulating layer on the target and the remainder of the target that makes the layer capacitances much less than the underlying series-connected junction capacitances. Capacitive voltage division between these series-connected capacitances then enables the multiple readout.

In addition, such a semi-insulating overlay could provide multiple readout in vidicon-type scan converters employing a continuous photoconductive thin film target.

*Background of the invention*

This invention relates to electron beam charge storage devices such as television camera tubes and scan converters, particularly those employing multiple readout of the stored charge pattern.

Video-telephone communication systems are being actively developed for general public use. The video signals are to be transmitted and switched through exchange and toll facilities of the type used in the telephone system. For economic reasons, it is desirable to conserve frequency bandwidth during transmission of video signals over such channels of communication. To this end, and with the loss of a highly animated display, the transmitted signal may have a relatively long frame period, associated with a slow scanning rate of the image information. By scanning rate, we mean the number of complete frames or complete pictures transmitted per second. The video signal associated with one frame successively represents the points along each line of the line-by-line raster scan of the television image.

In order to avoid objectionable flicker in the reproduced television image at the receiving set, it is desirable to scan the picture tube face at a more rapid rate, repeating the same image information a plurality of times as the signals of a new frame of image information arrive. This repetition is analogous to film projection where the same frame is displayed several times in order to avoid flicker.

Storage of the received signals, typically in the form of a charge pattern on the target of the aforementioned scan converter, is employed to achieve the above-described multiple scanning of the picture tube. The stored charge pattern is written by an electron beam onto the target at the incoming frame rate and is then read out by a second scanning electron beam a plurality of times. It is apparent that each readout should not be totally destructive of the stored charge, nor should the relative values of the stored charge pattern be altered significantly.

In a scan converter of the type employing an array of reversed-biased p-n junctions in a semiconductive target, one form of charge storage for multiple readout that has previously been proposed is the use of a heterojunction, a heterojunction being the junction formed between two different semiconductors. The heterojunction is formed near the surface at which energetic electrons of a writing electron beam produce electron-hole pairs responsible for the pattern of charge storage. Such a use of a heterojunction is described in our copending patent application, Ser. No. 645,333, filed June 12, 1967, and assigned to the assignee hereof. Traps for the minority carriers are inherent in a heterojunction. These traps effectively spread the diffusion of the minority carriers to the p-n junction over the span of several reading electron beam scans.

This technique for providing multiple readout in a scan converter has drawbacks, one of which is its lack of adaptation to mass production techniques. Specifically, the known techniques for growing a heterojunction on a silicon wafer typically require an unusually clean environment and a nearly perfect surface, such as a cleaved surface.

*Summary of the invention*

We have discovered an improved technique for multiple readout in a scan converter including a target having means for capacitively storing a plurality of charges concurrently at different coordinate positions. Broadly, the technique employs capacitive division of all voltage changes occurring across the target at the different positions, whereby the reading means can read out the charge storage states a plurality of times before eliminating a major portion of the stored charge. The technique makes use of a modified mutual adaptation of a semi-insulating layer and the remainder of the target. The use of a semi-insulating layer for other purposes was proposed in our copending patent application with Messrs. J. V. Dalton and E. F. Labuda, Ser. No. 641,257, filed May 25, 1967, and assigned to the assignee hereof. The semi-insulating layer was there employed for the purpose of moderating uncontrolled charge accumulation on the reading electron beam surface of the wafer.

Specifically, according to our invention, we have discovered that multiple readout is readily obtained when the p-n junction capacitances are substantially increased and the semi-insulating layer is provided with thicknesses and areas in registration with the p-n junctions providing layer capacitances that are much smaller than the capacitances of the corresponding p-n junctions. This allows controlled erasure of the stored charge pattern with simultaneous reading of the stored charge. Since the layer capacitances and the underlying junction capacitances are effectively connected in series, they divide any change in voltage occurring across the series combination according to the law of capacitive voltage division during the transient produced by each scan of the reading electron beam. Bacuse of this voltage division, the reading electron beam may recharge the junction capacitance only partially during each scan. The remaining surface charge which constitutes the signal to be read upon the next return of the reading electron beam appears by virtue of conduction through the semi-insulating film. The leakage or dielectric time constant normal to the plane of the film is chosen to be less than the normal frame time but substantially greater than the duration of each reading operation at one position. Thus, only a small percentage change in the output signal produced from each junction occurs during sucessive scans. The change occurs in a well-defined sequential manner and can be equalized by programmed changes in the gain of a video amplifier.

In order to provide the capacitance ratio that yields multiple readout, the junction capacitance is increased by a factor of at least two, and typically a factor greater than the desired number of reads, over the junction capacitances that would be used in the above-cited copending patent application Ser. No. 641,257. The increased junction capacitances may be obtained by a substantial decrease in the resistivity of the semiconductor target wafer to reduce the depletion width for a comparable target bias. Conversely, if the junction capacitance is kept the same as in the above-cited application Ser. No. 641,257, multiple readout could be obtained at a substantially impaired signal-to-noise ratio by employing thicknesses of the semi-insulating layer substantially greater than those which would be used in the embodiments disclosed in the above-cited copending patent application Ser. No. 641,257. The precise thickness would be determined by the desired ratio of junction to layer capacitance which, in turn, is determined by the desired number of reads.

It is desirable to maintain the lateral dielectric discharge time constant of the semi-insulating layer greater than the writing frame time as disclosed in that application, Ser. No. 641,257. The lateral dielectric discharge time constant is typically much greater than that normal to the film. Independent control of the lateral time constant can be obtained by selecting an appropriate thickness of the underlying oxide insulating layer.

According to another aspect of our invention, a semi-insulating layer providing capacitive voltage division would enable multiple readout in vidicon-type scan converters employing a continuous photoconductive thin film contacting the semi-insulating layer in the arget. The semi-insulating layer would comprise the reading electron beam surface of the target.

*Brief description of the drawings*

Further features and advantages of our invention will become apparent from the following detailed description, taken together with the drawing, in which.

*Description of illustrative embodiments*

Figure 1:
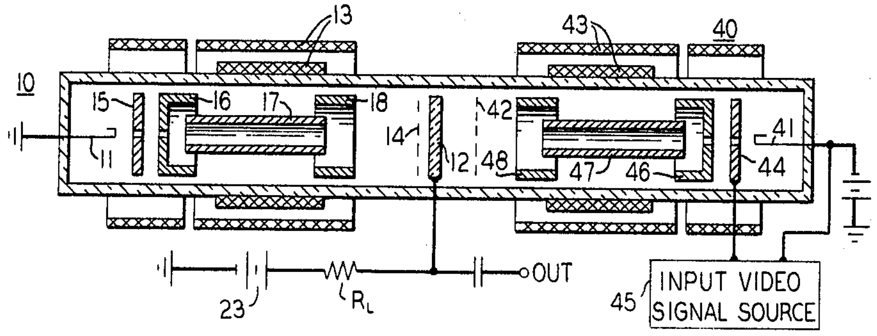
FIG. 1 is a partially pictorial cross section and partially schematic illustration of a first embodiment of the invention employed as a scan converter.

In the embodiment of FIG. 1, the image information supplied in the relatively slowly scanning writing electron beam from cathode 41 is stored in a target 12 and scanned more rapidly by the reading electron beam from cathode 11. The electron guns associated with each cathode 11, 41 includes magnetic deflection yokes 13 and 43, respectively, and apertured (15, 44) accelerating (16, 46) focusing (17, 47) and collimating (18, 48) electrodes. The writing electron beam from cathode 41 is accelerated sufficiently so that, after passage into the target 12, each of its electrons generates a plurality of electron-hole pairs in the substrate 20 of target 12. Since the beam from the cathode 41 writes information, supplied from source 45, more slowly than the beam from cathode 11 reads it out, it is desirable to provide charge storage in the target 12, which charge is not entirely destroyed by each of the scans of the reading electron beam from cathode 11. Neither should the relative value of charge stored on different parts of the target be altered greatly by one reading sequence. The input signal is typically applied to the writing electro beam at the apertured electrode 44 from an input video source 45, typically comprising the pre-display stages of a television receiver. The output signal is typically derived from the target 12 through a load resistor $R_L$ in response to the reading electron beam.

Figure 2:
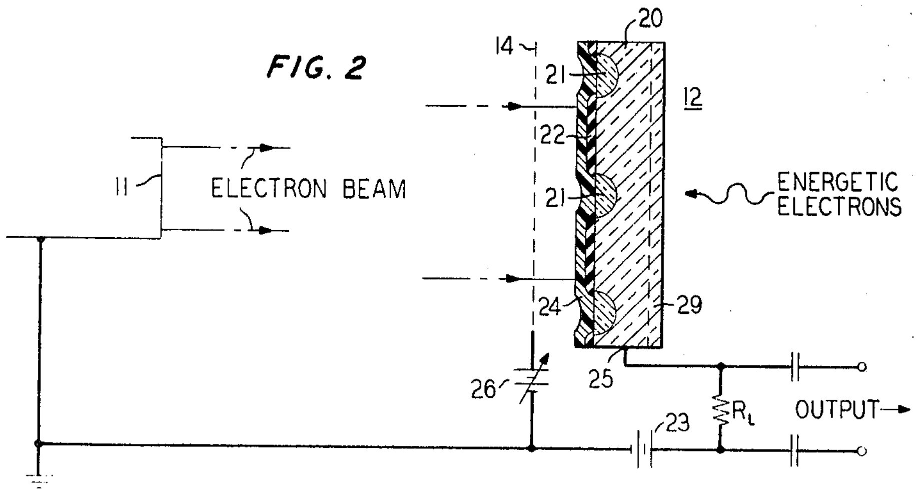
FIG. 2 is an enlarged sectional view of the target 12 of FIG. 1 together with associated circuitry shown schematically.

With reference to FIG. 2, the details of the target structure 12 may be more fully appreciated. It includes a monocrystalline silicon wafer 20, illustratively n-type, into which a regular array of p-type regions 21 have been formed by the diffusion of appropriate impurities through apertures in a silicon dioxide insulating layer 22. Under the condition in which the tube is operated, each of the p-type regions forms with respect to the n-type substrate a reverse-biased p-n junction diode. The capacity of this diode serves as the storage element. An impurity gradient region 29 is formed just under the surface which receives the energetic electrons of the writing electron beam and comprises a concentration of an n-type (donor) impurity, such as phosphorus, in order to create an internal electric field effect that will tend to prevent recombination of the minority carriers (holes) produced by the energetic electrons. Further details relating to the impurity gradient region 29 will be set forth hereinafter and are also disclosed and claimed in copending application of Messrs. T. M. Buck and J. V. Dalton, Ser. No. 676,197, filed concurrently herewith, and assigned to the assignee hereof.

Over the entire reading electron beam surface of the target 12 there is deposited a semi-insulating layer 24 adapted in accordance with our present invention.

Illustratively, the semi-insulating layer 24 is a loosely packed, granular mixture of silicon and silicon monoxide in which tiny granules make high resistance contact one to another. The inherent capacitances of the regions of layer 24 that are in registration with the p-n junctions, that is, that lie directly over the junctions from the materials standpoint, are in the range from $10^{-15}$ farads to $10^{-14}$ farads. The resistivity of these portions of the layer 24 illustratively is less than $10^9$ ohm-centimeters.

Preferred values of the capacitance and resistivity depend on the desired number of reads of the stored charge. For junctions 8 microns in diameter, the preferred layer capacitances correspond to a layer thickness of about 0.5 to 1.5 microns. The required, appropriately large, ratio of target capacitance to semi-insulating layer capacitance requires a target capacitance considerably greater, specifically about $3n$ times as great, where $n$ is the number of reads, than the junction capacitance useful in a camera tube using the same type of target. As a practical matter, assuming the thickness of the semi-insulating layer remains the same, the scan converter junction capacitance could vary from about $n$ times the corresponding camera tube junction capacitance to about $5n$ times. Target capacitance is the capacitance across the p-n junctions in the embodiment specifically disclosed. More generally, it would be the capacitance of each storage site of the target between its writing, or information input, surface and its interface with the semi-insulating layer.

The substrate 20 of the wafer is connected through the load resistance $R_L$ to a terminal of a constant voltage supply 23 that is positive with respect to ground. The secondary electron collector electrode 14 is connected to a positive terminal of supply 26 in order to collect secondary electrons emitted from target 12 in response to the reading electron beam. The mesh-like electrode 14 also serves to collimate the electron beam, which is rapidly decelerated in the region between the mesh and the target 12. The negative terminal of supply 23 is connected to cathode 11. The output signal is typically taken from the voltage across resistor $R_L$ as coupled through standard coupling capacitors.

Figure 3:
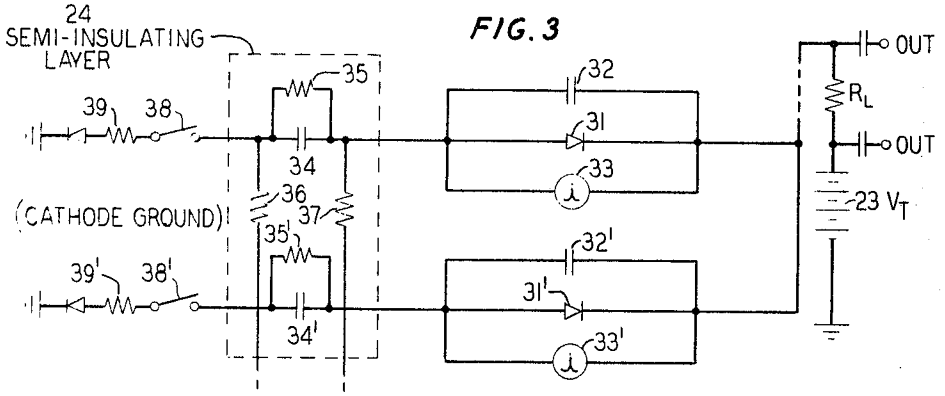
FIG. 3 is a schematic illustration of an equivalent circuit of a scan converter target according to our invention, which will be useful for the purpose of understanding the theory and operation of the invention.

The operation of the illustrative embodiment of the invention may be understood with reference to the equivalent circuit of FIG. 3. The semi-insulating layer 24 is schematically represented by the components within the dotted box of FIG. 3 and includes principally the capacitances 34 and 34' for neighboring areas in registration with neighboring p-n junctions in the target 12. The resistive properties of the semi-insulating layer is represented by the resistors 35, 36, 35' and 37. Since resistors 36 and 37 are much larger than 35 and 35', the parallel combination of capacitance 34 and resistance 35, and consequently the time-dependence of the voltage across the capacitance 34, can be treated essentially independent of the voltage across capacitance 34'.

The RC time constant of each of these parallel combinations is short compared to a frame time but long compared to the reading time for each diode. A typical RC time constant normal to the semi-insulating film of the scan converter is 0.1 to 5 milliseconds. Thus, for the brief instant that the reading electron beam is incident upon each of the areas in question, the change in the charge of the capacitances can be determined substantially accurately without reference to the resistances 35 and 35'. Similarly, although there is some conduction between these neighboring sites over periods longer than a frame period in order to moderate charge buildup on the surface between diodes, the lateral conduction resistances 36 and 37 are so large as not to have an appreciable effect on the change of charge across capacitance 34 and 34' during the period of incidence of the reading electron beam.

The incidence of the reading electron beam can be represented in the equivalent circuit by switches 38 and 38' which would be open to indicate the absence of the electron beam (i.e., each switch would be open for about $\frac{1}{30}$ second with 30 frames per second) at the particular site and would be closed to indicate its presence (i.e., each switch would be closed for less than 0.1 microsecond). The dynamic resistance of the reading electron beam can be represented approximately by the large series resistances 39 and 39' which are connected between switches 38 and 38', respectively, and ground. The voltage change that drives the readout operation is the difference between the voltage of source 23 and the voltage across the interrogated capacitance 32 or 32'.

The underlying p-n junctions are represented by the diodes 31 and 31' and the inherent junction capacitances are represented by the capacitances 32 and 32' connected in parallel with diode 31 and 31', respectively. The precise value of the junction capacitance will vary according to the use of the scan converter and varies slightly with the instantaneous value of the reverse bias of the diodes. The action of the writing electron beam is to create electron-hole pairs. The holes, upon diffusing to the junctions, partially discharge the inherent capacitance. This action is represented by the current sources 33 and 33'. The connection of the substrate 20 to voltage source 23 through load resistor $R_L$ is represented by like connections to the cathodes of the equivalent circuit diode 31 and 31'.

Of primary importance with respect to the operation of our invention is the fact that the capacitances 34 and 34' are substantially smaller than capacitances 32 and 32' respectively, preferably more than an order of magnitude smaller (i.e., a factor of ten). With these relationships clearly understood, it can now be seen that, if a junction capacitance represented as 32 or 32' is initially charged by the reading electron beam to reverse-bias the diodes 31 and 31', representatively occurring in response to repeated closures of switches 38 and 38', then the voltage across capacitances 32 and 32', in the absence of the writing beam current, equals the voltage across source 23, $V_T$, since the voltage across capacitances 34 and 34' is zero and the potential of the surface facing the beam is zero. The effect of the writing electron beam, as represented by pulse current sources 33 and 33' is to discharge partially the capacitances 32 and 32'. Note that the current sources 33 and 33' are operative only during the very short microsecond time interval following the incidence of the writing beam electrons on the substrate immediately behind the diodes 31 and 31'. The total charge associated with the current pulse is representative of the instantaneous video writing signal.

The writing beam scans over the entire array activating in sequence all the pulse current sources during a time equal to the frame time of the incoming video signal. The reverse-bias of the diodes is thereby reduced in a pattern over the entire array of p-n junctions that is representative of a video image. The reduction in reverse bias from its zero video signal value $V_T$ will be denoted as $\Delta V$. For the purpose of discussion, it will be assumed that $\Delta V \ll V_T$. Thus, the surface of film 24 facing the reading electron beam presents a voltage pattern exhibiting variations equal to the appropriate value of $\Delta V$ for each diode, and this pattern is representative of the video image.

Consider now, for example, what happens when the reading electron beam strikes the area represented by capacitance 34 and resistance 35. First, the switch 38 is closed, and charging current now flows from source 23 through $R_L$, capacitance 32, capacitance 34 (the shunt current through resistance 35 is negligible), switch 38 and resistance 39 to ground. This current flows until the voltage across the series combination of capacitances 32 and 34 equals the supply voltage $V_T$. The increase in voltage across the series combination due to the switch closure equals the voltage reduction $\Delta V$ produced by the pulse current source 33. Since capacitance 34 is, according to our invention, much smaller than capacitance 32, it will absorb a predominant portion of the voltage $\Delta V$ that originally produced the charging current upon switch closure. Therefore, the total charge transfer through the current path just described, is much less than if capacitance 34 was replaced by a good conductor or by a large coupling capacitance, as would be provided by a very thin layer 24. The charge originally supplied by the writing electron beam, represented by current source 33, was much larger, illustratively $1+C_d/C_f$ times larger, than the charge just transferred through capacitances 32 and 34, where $C_f$ is the capacity of capacitance 34 and $C_d$ the capacity of capacitance 32. Thus, capacitance 32 is only partially recharged. As the reading electron beam moves on to the next site, as would be represented by the opening of switch 38 and the closing of another switch, illustratively 38', a similar partial recharging of the junction capacitance 32' occurs. The voltage across capacitance 34 after reading has the value $$\frac{\Delta V}{1+C_f/C_d} \qquad (1)$$

This voltage decays rapidly to zero because of leakage through the resistance 35. The voltage across capacitance 32 which started out before recharging at the value $$V_T-\Delta V$$

now has the value $$V_T-\frac{\Delta V}{1+C_f/C_d} \qquad (2)$$

The surface of the film 24 facing the electron beam which previously had a potential $\Delta V$ now has a potential $$\frac{\Delta V}{1+C_f/C_d} \qquad (3)$$

Upon the next reading scan, a similar partial recharging of the junction capacitance 32 occurs. Each time the capacitance of the overlying portion of the semi-insulating layer 24, that is, capacitance 34, absorbs most of the change in voltage impressed across the series circuit. After the *n*th read, the surface potential has the value $$\frac{\Delta V}{(1+C_f/C_d)^n} \qquad (4)$$

The charge transferred through the resistor $R_L$ during each successive read is reduced by the factor $$(1+C_f/C_d)^{-1}$$

Since the value of $C_f/C_d$ is the same for each diode, the relative values of the signal generated over the entire storage surface are preserved from scan to scan and equal the relative values of the original stored charge.

If the recharging of the capacitance 32 to the full reverse-bias of diode 31, $V_T$, were represented graphically for several reading scans for each writing electron beam scan, it would be found that the points lie on an exponential curve. For approximately a three percent change in the voltage reduction $\Delta V$ across capacitance 32 for each reading electron beam scan, that is, $C_f/C_d=0.03$, the corresponding output signal differs from that of the preceding scans by about three percent, an amount which will not be readily detected by the eye. Moreover, it is possible to compensate for the decrease in signal amplitude from frame to frame which occurs in a precisely defined manner uniformly over the entire target by programming the gain of a video amplifier following the target resistor $R_L$. Thus, the displayed image will show no flicker from frame to frame. Typically with a scan compression ratio of $n$, i.e., $n$ reading frames for each writing frame, it would be desirable to choose $C_d/C_f \approx n$, which implies that the read signal decays to $1/e$ after $n$ reads, where $e$ is the base of the natural logarithms. Thus, the example given above applies to a scan compression ratio of $n \approx 30$.

The target structure 12 is typically mate as follows: a slice of monocrystalline n-type silicon, 0.5 to 15 mils thick, is polishel to form the substrate 20, then oxidized to form a layer of silicon dioxide in which an array of apertures 8 microns in diameter, 20 microns center-to-center, is etched using conventional photolithographic masking and etching techniques. The layer of silicon dioxide so etched forms the oxide insulating coating 22, 0.01 micron to 1 micron thick, but illustratively 0.1 micron thick. Boron is diffused into the exposed areas of the substrate 20 under appropriate diffusion conditions to form the p-type regions 21, with the oxide coating 22 acting as a diffusion mask. The resistivity of the substrate is chosen to form diodes of the appropriate capacitance. Typical resistivity is 0.01 ohm-centimeter, forming diodes with capacitance of typically $10^{-13}$ farads. Any boron glass or impurity layer that tends to form on the oxide coating is removed with a suitable solvent or etchant. To facilitate making a good ohmic contact 25 to the substrate 20 and to form the impurity gradient region 29, phosphorus is diffused into the exposed areas of the substrate at about 900 degrees centigrade for about 20 minutes; and any resulting glass or impurity layer is then removed from the oxide coating 22 with a suitable solvent. In the region 29, the phosphorus makes the material n+ with an impurity gradient as disclosed in the above cited copending application of Messrs. Buck and Dalton. The phosphorus diffusion has been found to improve the bulk properties of the device.

The semi-insulating layer 24 is formed over oxide coating 22, illustratively to a depth of one micron, by evaporating pulverized pure crystalline silicon or other suitable material over coating 22 in a horizontal position in an inert atmosphere until the thickness specified above is attained. Some silicon monoxide granules are formed by interaction with oxide coating 22. The silicon and silicon monoxide granules that form are held together by natural adhesion and make high resistance contact.

A good contact 25 is easily made to the n+ region by a conventional technique employing a vacuum-evaporated metal (gold, for example).

It should be noted that the foregoing process is readily adapted to make the substrate of p-type material and the target regions of n-type material. In this case, the reading electron beam removes electrons by secondary emission rather than depositing it. The diodes are thus reverse-biased. Now the secondary electrons generated by the energetic writing electrons effect discharging of the junctions.

Alternative materials for a semi-insulating layer 24 may illustratively be granular or amorphous elemental silicon, titanium dioxide, gallium arsenide, antimony trisulfide, silicon monoxide or a combination of the foregoing having resistivities in the ranges above specified. Also, a mixture of high resistivity and low resistivity materials may be advantageously employed. It now appears that a semi-insulating layer of titanium dioxide or gallium arsenide is readily provided with resistivity and layer capacitances in the ranges above specified.

A typical set of biases with respect to ground in the assemblies 10 and 40 of FIG. 1 are as follows:

| Component: | Volts |
|---|---|
| **11** | *0 |
| **20** (23) | +5 |
| **15** | −20 |
| **16** and **14** | +300 |
| **17** | +67 |
| **18** | +180 |
| **41** | −2,000 |
| **44** | −2,020 |
| **46** and **42** | −1,700 |
| **47** | −1,950 |
| **48** | −1,820 |

* (Ground.)

These biases are established by suitable bias voltage sources.

We claim:

1. An electron beam charge storage device of the type including a target having means for capacitively storing a plurality of charges concurrently at different coordinate positions and means for reading out the charge storage states at said coordinate positions in response to the incidence of an electron beam at each of the coordinate positions, said device being characterized in that said reading out means includes means for capacitively dividing in cooperation with said storing means the change in voltage impressed across said device during the incidence of the electron beam, whereby the reading means can read out the charge storage states a plurality of times before eliminating a major portion of the stored charge.

2. An electron beam charge storage device of the type including an array of discrete capacitive charge storage sites and means for reading out the charge storage states of said sites in response to the incidence of an electron beam at each of said sites, said device being characterized in that said reading out means includes means for capacitively dividing in cooperation with said sites the change in voltage impressed across said device during the incidence of the electron beam, whereby the reading means can read out the charge storage states a plurality of times before eliminating a major portion of the stored charge.

3. An electron beam charge storage device according to claim 2 including means for storing charge in the storage sites and in which the storage sites have capacitances and the means for capacitively dividing the change in voltage comprises a layer of material disposed over said sites in the path of the electron beam, said layer of material being semi-insulating in that it has, in the direction normal to the plane of said layer, a discharge time constant smaller than the time required for the electron beam to scan all of said sites and larger than the time required to scan any one site, said layer of material having capacitances in registration with said sites, each of said layer capacitances being smaller than the respective storage site capacitances by a factor of the order of magnitude of the number of times the target is to be read for each storing of charge in said sites.

4. An electron beam scan converter of the type including a target comprising a semiconductive wafer having an array of p-n junctions extending to a first surface of the wafer and possessing inherent capacitances of approximately a first value, an insulating coating covering the first surface and having apertures in registration with central portions of said junctions, scanning electron beam means for storing charge in the inherent capacitances of the p-n junctions, and scanning electron beam means for reading out the charge storage states of said junctions, the scanning rate of said reading electron beam means being substantially greater than the scanning rate of the storing electron beam means, said scan converter being characterized by a semi-insulating layer disposed over said coating and in said apertures and characterized by inherent capacitances series-connected with said inherent capacitances of said junction, said layer having a resistivity and thicknesses in said apertures providing said inherent layer capacitances of approximately a second value substantially less than said first value, whereby the reading electron beam means can read out the charge states of the junctions with repetitive electron beam scans for every electron beam scan of the storing means while preserving a substantial portion of the stored charge of the junctions.

5. An electron beam scan converter according to claim 4 in which the semi-insulating layer comprises a material selected from the group consisting of elemental silicon, silicon monoxide, titanium dioxide, gallium arsenide or antimony trisulfide or a combination of the foregoing in a granular or amorphous form.

References Cited

UNITED STATES PATENTS

| | | | |
|---|---|---|---|
| 2,972,082 | 2/1961 | Kallmann et al. | 313—67 X |
| 3,322,955 | 5/1967 | Desuignes | 313—66 X |

RODNEY D. BENNETT, Jr. *Primary Examiner.*

JEFFREY P. MORRIS, *Assistant Examiner.*

U.S. Cl. X.R.

313—66